United States Patent
Kim et al.

(10) Patent No.: US 12,424,714 B2
(45) Date of Patent: Sep. 23, 2025

(54) ELECTROLYTE INJECTION DEVICE AND ELECTROLYTE INJECTION METHOD USING THE SAME

(71) Applicant: LG Energy Solution, Ltd., Seoul (KR)

(72) Inventors: Won Nyeon Kim, Daejeon (KR); Soon Kwan Kwon, Daejeon (KR); Byeong Kyu Lee, Daejeon (KR); Su Taek Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 601 days.

(21) Appl. No.: 17/778,608

(22) PCT Filed: Nov. 11, 2020

(86) PCT No.: PCT/KR2020/015735
§ 371 (c)(1),
(2) Date: May 20, 2022

(87) PCT Pub. No.: WO2021/107460
PCT Pub. Date: Jun. 3, 2021

(65) Prior Publication Data
US 2022/0407198 A1    Dec. 22, 2022

(30) Foreign Application Priority Data
Nov. 25, 2019 (KR) .......... 10-2019-0152102

(51) Int. Cl.
*H01M 50/609* (2021.01)
*H01M 50/105* (2021.01)

(52) U.S. Cl.
CPC ........ *H01M 50/609* (2021.01); *H01M 50/105* (2021.01)

(58) Field of Classification Search
CPC .................. H01M 50/609; H01M 50/105
See application file for complete search history.

(56) References Cited

U.S. PATENT DOCUMENTS

| | | | |
|---|---|---|---|
| 2011/0097615 A1* | 4/2011 | Goh et al. ........... | H01M 10/04 |
| | | | 429/94 |
| 2012/0244402 A1 | 9/2012 | Saeki | |

(Continued)

FOREIGN PATENT DOCUMENTS

| | | |
|---|---|---|
| CN | 108539278 A | 9/2018 |
| CN | 109417156 A | 3/2019 |

(Continued)

OTHER PUBLICATIONS

Kwon et al. "KR20150095387A English Translation", Aug. 21 (Year: 2015).*

(Continued)

*Primary Examiner* — Matthew T Martin
*Assistant Examiner* — Alexandra J Simmons
(74) *Attorney, Agent, or Firm* — Lerner David LLP

(57) ABSTRACT

The present invention relates to an electrolyte injection device including a base portion on which a preliminary battery cell is disposed on an upper surface thereof, a movable pressing jig attached to the base portion, and an electrolyte injection pipe configured to inject an electrolyte into the preliminary battery cell, wherein the movable pressing jig includes a portion configured to press the preliminary battery cell in a direction perpendicular to an upper surface and a lower surface of an electrode assembly receiving portion of the preliminary battery cell, and thus it is possible to prevent a phenomenon in which a separator is folded or peeled off even when an electrolyte injection rate is high.

10 Claims, 6 Drawing Sheets

(56) References Cited

U.S. PATENT DOCUMENTS

2015/0221972 A1    8/2015   Ikeda
2019/0131666 A1    5/2019   Lee et al.

FOREIGN PATENT DOCUMENTS

| CN | 209515850 U | | 10/2019 | | |
|----|----|----|----|----|----|
| EP | 3457464 A1 | | 3/2019 | | |
| JP | 2011134631 A | | 7/2011 | | |
| JP | 2012204104 A | | 10/2012 | | |
| JP | 2016046178 A | | 4/2016 | | |
| JP | 6037428 B2 | | 12/2016 | | |
| KR | 20150095387 A | * | 8/2015 | ............ | H01M 50/60 |
| KR | 20160086196 A | | 7/2016 | | |
| KR | 20170071971 A | | 6/2017 | | |
| KR | 20170094669 A | | 8/2017 | | |
| KR | 20180069707 A | * | 6/2018 | .......... | H01M 10/052 |
| KR | 102004295 B1 | | 7/2019 | | |

OTHER PUBLICATIONS

Lee et al., "KR20180069707A English Translation", Jun. 25 (Year: 2018).*

Extended European Search Report including Written Opinion for Application No. 20893516.3 dated Jan. 2, 2023, pp. 1-7.

International Search Report for Application No. PCT/KR2020/015735 mailed Feb. 15, 2021, pp. 1-3.

* cited by examiner

[FIG. 1]
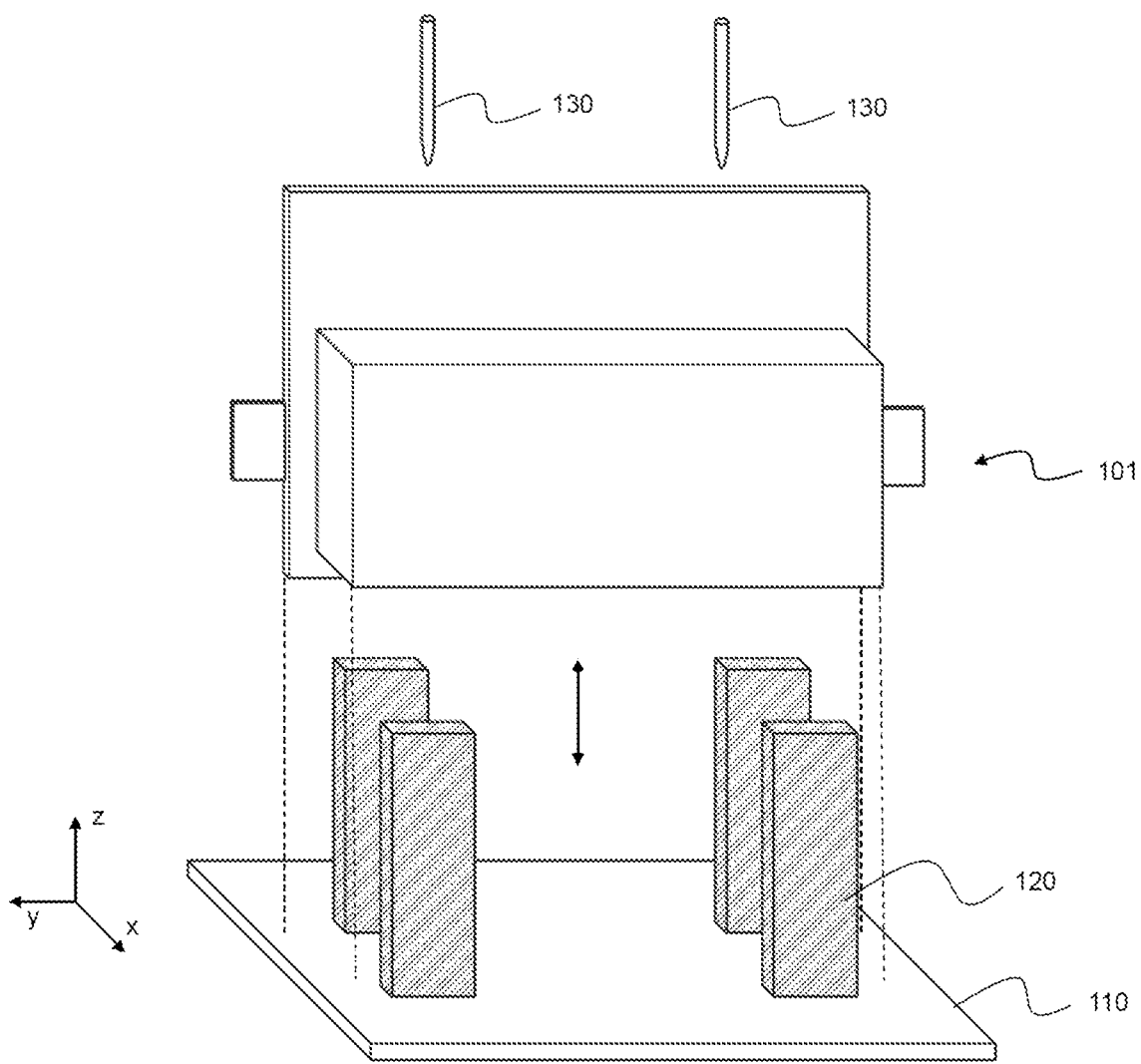

[FIG. 2]
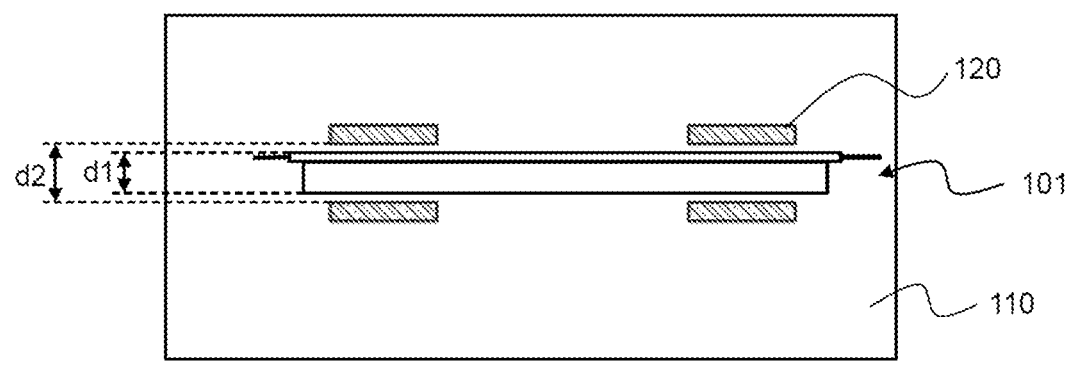

[FIG. 3]
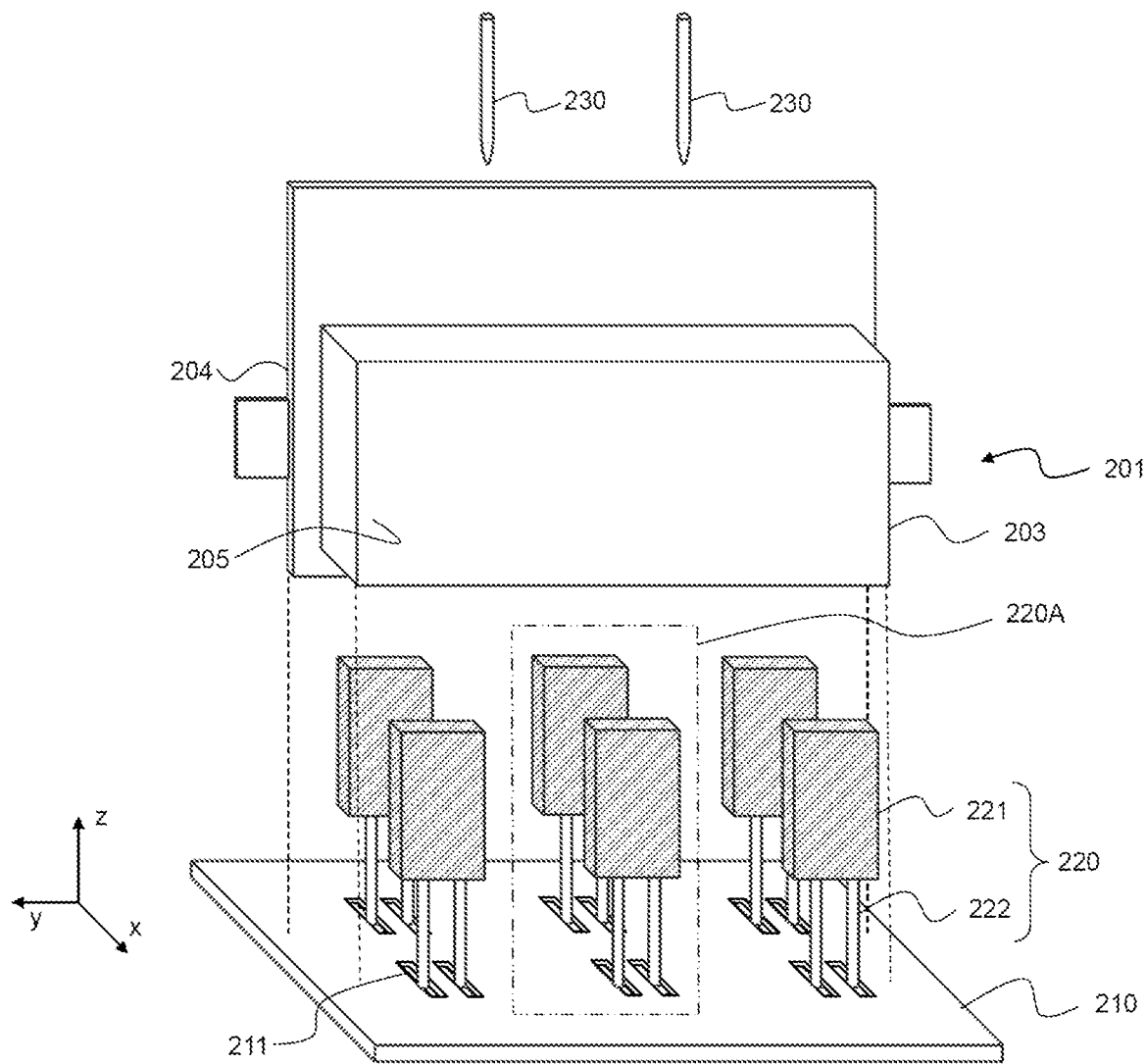

[FIG. 4]
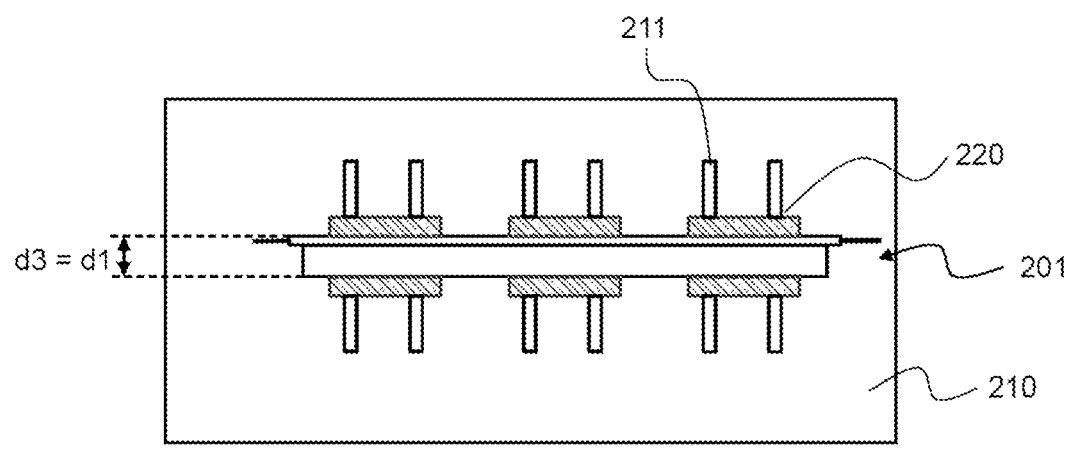

【FIG. 5】
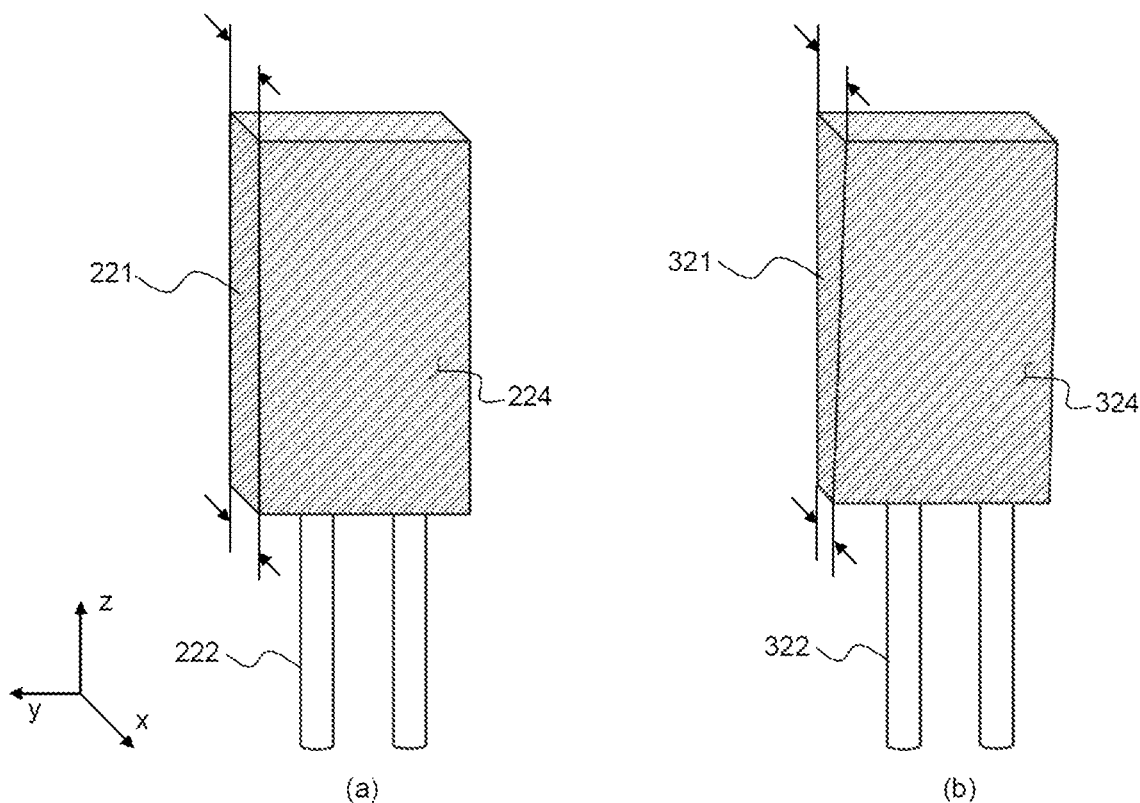

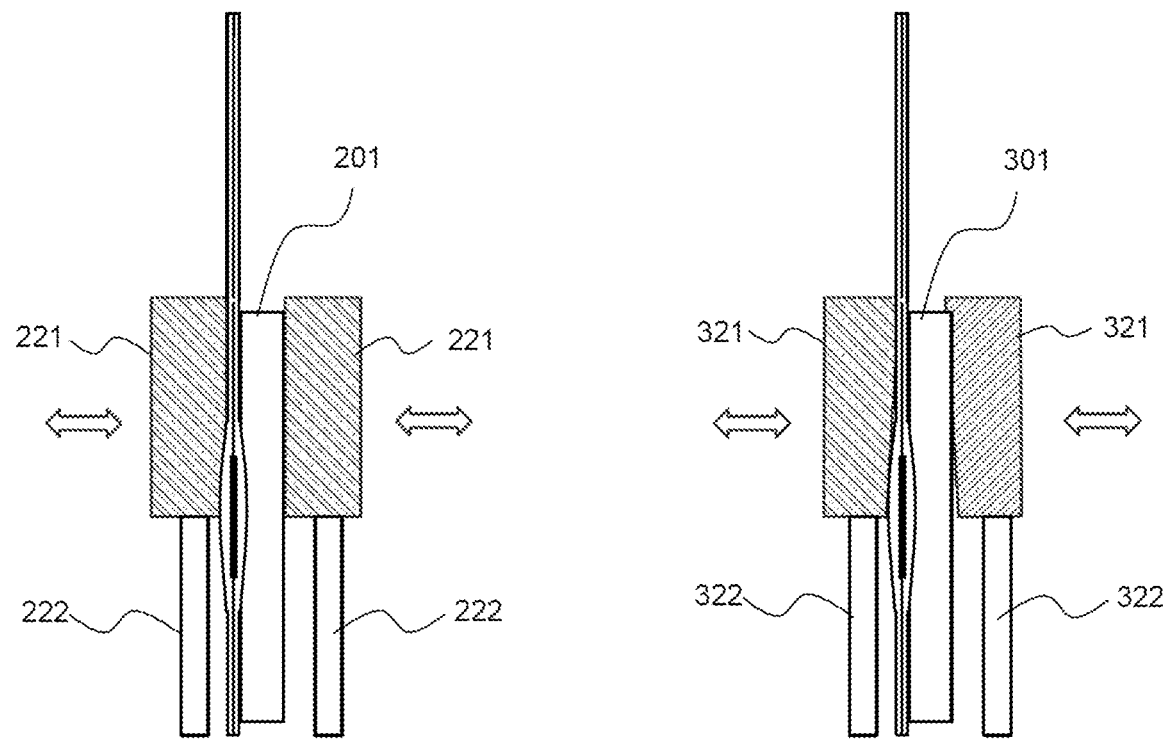
[FIG. 6]

ELECTROLYTE INJECTION DEVICE AND ELECTROLYTE INJECTION METHOD USING THE SAME

CROSS-REFERENCE TO RELATED APPLICATIONS

This application is a national stage entry under 35 U.S.C. § 371 of International Application No. PCT/KR2020/015735, filed on Nov. 11, 2020, published in Korean, which claims priority to Korean Patent Application No. 10-2019-0152102 filed on Nov. 25, 2019, the disclosures of which are incorporated herein by reference in their entireties.

TECHNICAL FIELD

The present invention relates to an electrolyte injection device and an electrolyte injection method using the same, and more particularly to an electrolyte injection device including a structure capable of pressing and fixing a preliminary battery cell in order to prevent folding of a separator of an electrode assembly in the process of injecting an electrolyte for manufacturing a battery cell and an electrolyte injection method using the same.

BACKGROUND ART

A lithium secondary battery, which is reusable and has high energy density, has attracted attention as a new energy source having environmentally friendly characteristics, since the lithium secondary battery is capable of remarkably reducing the use of fossil fuels and generates no byproducts as the result of using energy.

The lithium secondary battery may be classified as a pouch-shaped battery cell made of a laminate sheet, a cylindrical battery cell made of a metal can, or a prismatic battery cell based on the kind and shape of a sheathing material. An electrode assembly is classified as a jelly-roll type electrode assembly, a stacked type electrode assembly, or a stacked/folded type or laminated/stacked type electrode assembly based on the shape thereof.

The pouch-shaped lithium secondary battery is manufactured by receiving an electrode assembly and an electrolyte in a pouch-shaped battery case made of a laminate sheet, and then sealing an outer periphery of the battery case by a heating and pressing method.

In connection therewith, FIG. 1 shows a part of a process of injecting an electrolyte into a conventional pouch-shaped battery cell, and FIG. 2 is a plan view showing a state in which an electrolyte injection pipe is omitted in FIG. 1.

Referring to FIGS. 1 and 2, an electrolyte injection device includes a base portion 110, a jig 120, and an electrolyte injection pipe 130, and the jig 120 has a structure in which the jig 120 is fixed to the base portion 110 and is in a state that cannot be moved.

Two pairs of jigs 120 facing each other based on a space in which a preliminary battery cell 101 is accommodated are fixedly disposed on the base portion 110, and an x-direction distance d2 between the jigs 120 is greater than a thickness d1 of the preliminary battery cell 110. Therefore, it is possible to easily insert and remove the preliminary battery cell 110 between the jigs.

As described above, the jig is not in close contact with the preliminary battery cell but is located with spacing apart therefrom, and thus the jig is used as a cradle for the preliminary battery cell.

In general, important considerations in the electrolyte injection process are the amount of electrolyte and the injection rate of the electrolyte. In order to increase the production rate, as the injection rate of the electrolyte is increased, the force exerted by the electrolyte to an electrode assembly is also increasing. Thus, a phenomenon in which an interface between an electrode and a separator is peeled off or a separator is folded into an electrode is increasing.

Moreover, as shown in FIGS. 1 and 2, when the jig of the electrolyte injection device is disposed to be spaced apart from a pouch-shaped battery cell, the possibility of occurrence of the above problems is further increased.

Therefore, there is a high necessity for a technology to prevent a phenomenon in which a separator is folded or an interface between an electrode and a separator is peeled off in the process of injecting an electrolyte into a pouch-shaped battery cell.

DISCLOSURE

Technical Problem

The present invention has been made in view of the above problems, and it is an object of the present invention to provide an electrolyte injection device including a movable pressing jig including a portion for fixing and pressing a battery cell, and an electrolyte injection method using the same, in order to prevent an interface between an electrode and a separator from being peeled off or a separator from being folded during the electrolyte injection process.

Technical Solution

In order to accomplish the above object, an electrolyte injection device according to the present invention includes a base portion on which a preliminary battery cell is disposed on an upper surface thereof, a movable pressing jig attached to the base portion, and an electrolyte injection pipe configured to inject an electrolyte into the preliminary battery cell, wherein the movable pressing jig includes a portion configured to press the preliminary battery cell in a direction perpendicular to an upper surface and a lower surface of an electrode assembly receiving portion of the preliminary battery cell.

The movable pressing jig may be configured to which press a portion of an outer periphery of an electrode assembly disposed in the electrode assembly receiving portion, the portion of the outer periphery being adjacent to a location at which the electrolyte is injected.

The movable pressing jig may include a pressing portion configured to press the preliminary battery cell, and a support portion configured to support the pressing portion.

In a concrete example, in a state in which the movable pressing jig presses the preliminary battery cell, the pressing portion may be in close contact with the preliminary battery cell to press the preliminary battery cell, and the support portion may be spaced apart from the preliminary battery cell.

The movable pressing jig may be constituted by a plurality of unit movable pressing jigs, and the plurality of unit movable pressing jigs may be disposed to be spaced apart from neighboring unit movable pressing jigs such that the electrolyte moves into the preliminary battery cell.

The pressing portion may be configured such that a surface facing the preliminary battery cell is a plane parallel to an outer surface of the preliminary battery cell.

Alternatively, the pressing portion may be configured such that a surface facing the preliminary battery cell is a plane inclined with respect to an outer surface of the preliminary battery cell.

The electrolyte injection pipe may spray the electrolyte toward a portion of an outer periphery of the electrode assembly in which the movable pressing jig is not disposed.

The present invention provides a method of manufacturing a battery cell using the electrolyte injection device, in particular, the method including: moving a movable pressing jig in a first direction so as to increase a distance between the movable pressing jigs in order to secure a position on which a preliminary battery cell is disposed; positioning the preliminary battery cell on a base portion; pressing the preliminary battery cell by moving the movable pressing jig in a second direction so as to narrow the distance between the movable pressing jigs; and injecting an electrolyte into the preliminary battery cell.

The movable pressing jig may include three or more pairs of unit movable pressing jigs facing each other with the preliminary battery cell interposed therebetween.

Further, the preliminary battery cell may be separated from the base portion by moving the movable pressing jig again in the first direction after the step of injecting the electrolyte.

In the step of injecting the electrolyte, the electrolyte injection pipe may spray the electrolyte toward a portion in which the movable pressing jig does not press a battery cell.

The present invention also provides a pouch-shaped battery cell manufactured by using the electrolyte injection method, and includes a battery pack including the battery cell as a unit battery cell.

DESCRIPTION OF DRAWINGS

FIG. 1 is a perspective view showing a part of a process of injecting an electrolyte into a conventional pouch-shaped battery cell.

FIG. 2 is a plan view showing a state in which an electrolyte injection pipe is omitted in FIG. 1.

FIG. 3 is a front view showing a portion of a process of injecting an electrolyte into a preliminary battery cell using an electrolyte injection device according to the present invention.

FIG. 4 is a plan view showing a state in which an electrolyte injection pipe is omitted in FIG. 3.

FIG. 5 is a perspective view of movable pressing jigs.

FIG. 6 is a side view showing a state in which the movable pressing jigs of FIG. 5 are in close contact with an outer surface of a preliminary battery cell.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

A description to embody elements through limitation or addition in this specification may be applied to all inventions, unless particularly restricted, and does not limit a specific invention.

Hereinafter, an embodiment of the present invention will be described in detail with reference to the accompanying drawings.

FIG. 3 is a front view showing a portion of a process of injecting an electrolyte into a preliminary battery cell using an electrolyte injection device according to the present invention.

FIG. 4 is a plan view showing a state in which an electrolyte injection pipe is omitted in FIG. 3.

Referring to FIGS. 3 and 4, an electrolyte injection device includes a base portion 210 on which a preliminary battery cell 201 is disposed on an upper surface thereof, a movable pressing jig 220 attached to the base portion, and an electrolyte injection pipe 230 configured to inject an electrolyte into the preliminary battery cell, wherein a groove 211 is formed on the upper surface of the base portion 210 so as to move the movable pressing jig 220 in an x-axis direction.

The preliminary battery cell refers to a battery cell in a stage prior to an assembled battery cell. In the present invention, a battery cell in which an electrolyte is injected while being fixed to an electrolyte injection device is referred to as a preliminary battery cell.

The preliminary battery cell is a type in which an electrolyte is injected before a battery case is completely sealed. For example, it may be a pouch-shaped battery cell.

Each of the two movable pressing jigs 220 disposed on both sides facing each other based on the preliminary battery cell 201 is arranged in pairs. The movable pressing jigs may move in a first direction, which is a direction in which the distance between each other is increased, or may move in a second direction, which is a direction in which the distance between each other becomes close.

Therefore, when the preliminary battery cell is placed on the base portion and then the movable pressing jig is moved in the second direction to fix and press the preliminary battery cell, a separator of an electrode assembly is maintained in its original position by the movable pressure jig. Thus, it is possible to prevent the separator from being folded or peeled off by the pressure of the electrolyte injected into the preliminary battery cell.

The movable pressing jig includes a portion configured to press the preliminary battery cell in a direction perpendicular to an upper surface 204 of an electrode assembly receiving portion 203 of the preliminary battery cell and a lower surface 205 of the electrode assembly receiving portion of the preliminary battery cell, whereby only a portion of the movable pressing jig presses the preliminary battery cell.

Specifically, the movable pressing jig 220 includes a pressing portion 221 configured to press the preliminary battery cell 201 and a support portion 222 configured to move the movable pressing jig through a groove 211 while supporting the pressing portion 221.

As described above, the pressing portion 221 presses the preliminary battery cell in close contact with an outer surface of the preliminary battery cell 201 to prevent the separator from being separated from an electrode or folded, and the support portion does not contact the preliminary battery cell.

In the case in which the movable pressing jig presses the entire upper and lower surfaces of the electrode assembly receiving portion, it is difficult for the electrolyte to penetrate into the electrode assembly, and the amount of the injected electrolyte may be lowered, which is not preferable. Accordingly, the movable pressing jig according to the present invention is configured to have a structure in which the movable pressing jig presses the outer periphery of the electrode assembly in a direction in which the electrolyte is injected and does not press the rest of the electrode assembly, whereby it is possible to prevent the separator from being folded by the injection of the electrolyte while it is possible to prevent the electrolyte impregnation property of the electrode assembly from deteriorating.

In addition, a passage through which the electrolyte can flow into the electrode assembly is required. Therefore, the movable pressing jig is constituted by a plurality of unit movable pressing jigs, and the plurality of unit movable pressing jigs may be disposed to be spaced apart from neighboring unit movable pressing jigs such that the electrolyte can move into the preliminary battery cell.

In connection therewith, FIG. 3 shows a state in which three pairs of unit movable pressing jigs 220A are spaced apart from each other. However, the number of pairs of the unit movable pressing jigs may also be applied in three or more pairs in consideration of a total length of the battery cell.

Meanwhile, FIG. 4 shows a state in which a thickness d1 of the preliminary battery cell and a distance d3 between the pressing portions in the state in which the movable pressing jig presses are the same. However, depending on the magnitude of the pressing force, the distance d3 between the pressing portions in the state in which the movable pressing jig presses may be shorter than the thickness d1 of the preliminary battery cell in an x-direction.

In addition, in a thickness of the preliminary battery cell in the state in which the electrolyte injection device pressurizes the preliminary battery cell, a thickness of a portion pressed by the pressing portion may be relatively thinner than a thickness of a portion not pressed by the pressing portion.

The electrolyte is strongly injected at high speed into the preliminary battery cell. Therefore, in order to prevent the electrolyte from being bounced out of the preliminary battery cell by the pressing portion, the electrolyte injection pipe 230 sprays the electrolyte toward a portion of the outer periphery of the electrode assembly in which the movable pressing jig 220 is not disposed.

FIG. 5 is a perspective view of movable pressing jigs, and FIG. 6 is a side view showing a state in which the movable pressing jigs of FIG. 5 are in close contact with an outer surface of a preliminary battery cell.

Referring to FIGS. 5 and 6, in a movable pressing jig (a) and a movable pressing jig (b), each of a support portion 222 and a support portion 322 is coupled to a position retracted from the preliminary battery cell than each of a pressing portion 221 and a pressing portion 321 in close contact with the preliminary battery cell.

Accordingly, in a state in which the movable pressing jig presses the preliminary battery cell, the pressing portion presses the preliminary battery cell in close contact with the preliminary battery cell, while the support portion is spaced apart from the preliminary battery cell. Therefore, only a portion of an electrode assembly of the preliminary battery cell in close contact with the pressing portion is pressed.

In the movable pressing jig (a), the pressing portion 221 has a surface 224 facing the preliminary battery cell, which is a plane parallel to an outer surface of the preliminary battery cell.

In the movable pressing jig (b), the pressing portion 321 has a surface 324 facing the preliminary battery cell, which is a plane inclined with respect to the outer surface of the preliminary battery cell.

In the case in which an inclined surface is included such as the pressing portion 321, the separator extending from the outer periphery of the electrode assembly can be more stably fixed, while the pressing force on the outer surface of the electrode assembly is weakly applied, whereby it is possible to improve the electrolyte impregnation property.

A specific electrolyte injection method according to the present invention includes moving a movable pressing jig in a first direction so as to increase a distance between the movable pressing jigs in order to secure a position on which a preliminary battery cell is disposed; positioning the preliminary battery cell on a base portion; pressing the preliminary battery cell by moving the movable pressing jig in a second direction so as to narrow the distance between the movable pressing jigs; and injecting an electrolyte into the preliminary battery cell.

In the step of injecting the electrolyte, the electrolyte is sprayed toward a portion in which the movable pressing jig does not press a battery cell, thereby preventing the electrolyte from being bounced out of the preliminary battery cell by the movable pressing jig.

After the electrolyte is injected, the movable pressing jig moves in the first direction again to separate the preliminary battery cell from the base portion.

The separated preliminary battery cell is subjected to a temporarily sealing of an outer periphery of the separated preliminary battery cell in a direction in which the electrolyte is injected and an activation process. Thereafter, the separated preliminary battery cell may be subjected to an exhaust process and a resealing process to manufacture a pouch-shaped battery cell.

As described above, when the electrolyte injection device and the electrolyte injection method according to the present invention are used, the bonding state of the electrode and the separator is stably fixed since the pressing portion strongly presses the electrode assembly of the preliminary battery cell.

Consequently, it is possible to prevent the separator from being peeled off from the electrode or folded into the electrode assembly by the electrolyte sprayed with a strong pressure, whereby it is possible to improve the productivity of the battery cell.

Those skilled in the art to which the present invention pertains will appreciate that various applications and modifications are possible within the category of the present invention based on the above description.

DESCRIPTION OF REFERENCE NUMERALS 101, 201: Preliminary battery cells
110, 210: Base portions
120: Jig
130, 230: Electrolyte injection pipes
203: Electrode assembly receiving portion
204: Upper surface of electrode assembly receiving portion

205: Lower surface of electrode assembly receiving portion
211: Groove
220: Movable pressing jig
220A: Pair of unit movable pressing jigs
221, 321: Pressing portions
222, 322: Support portions
224, 324: Surfaces facing a preliminary battery cell
d1: Thickness of preliminary battery cell
d2: x-direction distance between jigs
d3: Distance between pressing portions in a state that a movable pressing jig applies pressure

INDUSTRIAL APPLICABILITY

As is apparent from the above description, in the present invention, an electrolyte is injected while pressing a case of a preliminary battery cell surrounding an electrode assembly, whereby it is possible to prevent a separator from falling off an electrode even if the injection pressure of the electrolyte is high.

In addition, since the electrolyte is injected in a state in which the adhesion between the electrode and the separator is stably maintained, it is possible to prevent a phenomenon in which the separator is rolled into the electrode.

In addition, since the movable pressing jig is of a movable form, it is possible to easily detach the preliminary battery cell from the electrolyte injection device by increasing a distance between the movable pressing jigs or moving the movable pressing jigs closer.

In addition, by pressing only the outer periphery of the electrode assembly in a direction in which the electrolyte is injected, it is possible to secure an effect of preventing the separator from folding as well as the electrolyte impregnation property of the electrode assembly.

The invention claimed is:

1. An electrolyte injection device comprising:
a base portion configured to receive a preliminary battery cell disposed on an upper surface thereof;
a movable pressing jig movably coupled to the base portion, the movable pressing jig including a plurality of unit movable pressing jigs, each of the plurality of unit movable pressing jigs being spaced apart from adjacent ones of the unit movable pressing jigs in a first lateral direction parallel to upper and lower major surfaces the preliminary battery cell; and
an electrolyte injection pipe configured to inject an electrolyte into the preliminary battery cell toward a portion of an outer periphery of the electrode assembly against which the movable pressing jig is not pressing, the portion located in a space between the adjacent ones of the movable pressing jigs in the first lateral direction,
wherein the movable pressing jig comprises portions configured to press the preliminary battery cell in directions perpendicular to first and second opposite planar surfaces of an electrode assembly receiving portion of the preliminary battery cell.

2. The electrolyte injection device according to claim 1, wherein the movable pressing jig is configured to press a portion of an outer periphery of an electrode assembly disposed in the electrode assembly receiving portion, the portion of the outer periphery being adjacent to a location at which the electrolyte is injected.

3. The electrolyte injection device according to claim 1, wherein the movable pressing jig comprises pressing portions configured to press the preliminary battery cell, and support portions configured to support respective ones of the pressing portions.

4. The electrolyte injection device according to claim 3, wherein the electrolyte injection device is configured such that, in a state in which the movable pressing jig presses the preliminary battery cell,
the pressing portions are in close contact with the preliminary battery cell preliminary battery cell, and
the support portions are spaced apart from the preliminary battery cell.

5. The electrolyte injection device according to claim 3, wherein a surface of each pressing portion configured to face the preliminary battery cell is a plane configured to be oriented parallel to an outer planar surface of the preliminary battery cell.

6. The electrolyte injection device according to claim 3, wherein a surface of each pressing portion configured to face the preliminary battery cell is a plane configured to be inclined with respect to an outer planar surface of the preliminary battery cell.

7. An electrolyte injection method for manufacturing a battery cell using an electrolyte injection device, the electrolyte injection method comprising:
moving movable pressing jigs of the electrolyte injection device in a first direction to increase a distance between opposite ones of the movable pressing jigs, the movable pressing jigs including a plurality of unit movable pressing jigs, each of the plurality of unit movable pressing jigs being spaced apart from adjacent ones of the unit movable pressing jigs in a second lateral direction perpendicular to the first direction;
positioning a preliminary battery cell on a base portion of the electrolyte injection device between the opposite ones of the movable pressing jigs;
pressing the preliminary battery cell by moving the movable pressing jigs in a third direction opposite the first direction to narrow the distance between the opposite ones of the movable pressing jigs; and
injecting an electrolyte into the preliminary battery cell such that an electrolyte injection pipe sprays the electrolyte toward a portion of the preliminary battery cell against which the movable pressing jigs are not pressing the preliminary battery cell, the portion located in a space between the adjacent ones of the movable pressing jigs in the second lateral direction.

8. The electrolyte injection method according to claim 7, wherein the movable pressing jigs include three or more pairs of unit movable pressing jigs facing each other, such that during the positioning of the preliminary battery cell on the base portion, the preliminary battery cell is interposed therebetween opposite ones of the three or more pairs of the unit movable pressing jigs.

9. The electrolyte injection method according to claim 7, further comprising removing the preliminary battery cell from the base portion, the removing including moving the movable pressing jig in the first direction again to increase the distance between the opposite ones of the movable pressing jigs after the injecting of the electrolyte.

10. The battery cell manufactured by using the electrolyte injection method according to claim 7.

\* \* \* \* \*